(12) United States Patent
Vandervort et al.

(10) Patent No.: US 9,727,746 B2
(45) Date of Patent: Aug. 8, 2017

(54) POLICY AWARE CONFIGURABLE DATA REDACTION BASED ON SENSITIVITY AND USE FACTORS

(71) Applicant: XEROX CORPORATION, Norwalk, CT (US)

(72) Inventors: David R. Vandervort, Walworth, NY (US); Andrés Quiroz Hernandez, Rochester, NY (US); Yasmine Charif, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 982 days.

(21) Appl. No.: 14/033,831

(22) Filed: Sep. 23, 2013

(65) Prior Publication Data

US 2015/0089357 A1    Mar. 26, 2015

(51) Int. Cl.
*G06F 21/62* (2013.01)
*G06F 17/24* (2006.01)

(52) U.S. Cl.
CPC .............. *G06F 21/62* (2013.01); *G06F 17/24* (2013.01)

(58) Field of Classification Search
CPC ........... G06F 17/24; G06F 21/62; G06F 17/30
USPC .......................................... 715/256; 707/600
See application file for complete search history.

(56) References Cited

U.S. PATENT DOCUMENTS

2013/0144901 A1* 6/2013 Ho .................... G06F 17/30498
                                                                707/769
2014/0380404 A1* 12/2014 Raj ...................... G06F 21/6218
                                                                726/1

OTHER PUBLICATIONS

Securosis. "Understanding and selecting data masking solutions: Creating secure and useful data", Aug. 10, 2012, Securosis L.L.C., Ver. 1.0.*

* cited by examiner

*Primary Examiner* — Pierre Vital
*Assistant Examiner* — Alicia Antoine
(74) *Attorney, Agent, or Firm* — MH2 Technology Law Group LLP (57) ABSTRACT

The present invention generally relates to systems and methods for document redaction. The disclosed techniques adapt to the needs of different levels of data sensitivity and different needs for disclosure or analysis by using pre-defined templates related to use cases, and mapping those to the relative sensitivity of private data types both in their natural form and after redaction by various redaction types. In this way, data is given the appropriate level of protection within the needs of a given use case.

13 Claims, 8 Drawing Sheets

| | | | |
|---|---|---|---|
| 102 → | MASK | REPLACE DATA WITH A STRING OF X'S | 12345 => XXXXX | COMPLETE REMOVAL OF DATA |
| 104 → | TOKENIZE | GENERATE A RANDOM STRING OF CHARACTERS THAT WILL REPLACE EVERY INSTANCE OF THE DATA IN THE SAME DOCUMENT | "JOHN SMITH" => "JzcCxu2xA" EVERY TIME "JOHN SMITH" APPEARS IN THE SAME DOCUMENT | ALLOWS LINKING OF RECORDS WITHIN A DOCUMENT OR DATA SET WHILE BREAKING AGGREGATIOIN ACROSS MULTIPLE DOCUMENTS. |
| 106 → | ENCRYPT | USING ONE OR MORE KEYS THE DATA IS TRANSFORMED VIA SOME ENCRYPTION ALGORITHM. | "JOHN SMITH" + "THIS IS A PRIVATE KEY" => "EnCt23398db7" EVERY TIME "JOHN SMITH APPEARS IN ANY DOCUMENT | IF THE KEYS AND THE ALGORITHM ARE KNOWN THE PROCESS CAN BE REVERSED TO REVEAL THE ORIGINAL DATA. ALLOWS LINKING OF RECORDS ACROSS AN ENTIRE DATA CORPUS WHILE PROTECTING THE SOURCE DATA. |
| 108 → | CATEGORIZE | REPLACE DATA WITH A NOUN REPRESENTING ITS CATEGORY. | "WELLBUTRIN" => "[PHARMACEUTICAL]" | ALLOWS AGGREGATION ANALYSIS WHILE PROTECTING PRIVACY OF SPECIFIC ITEMS |
| 110 → | RANDOMIZE | REPLACE DATA WITH A RANDOM STRING THAT IS DIFFERENT FOR EVERY INSTANCE OF THE DATA | "JOHN SMITH" => "zZ2rr7y" ONCE, BUT => "jjs90ahAAb4" THE NEXT TIME | BREAKS ALL LINKAGES BETWEEN RECORDS AND COMPLETELY HIDES ORIGINAL DATA. |
| 112 → | AGGREGATE | REDUCE DATA DIFFERENTIATION BY LUMPING SIMILAR VALUES INTO BROAD CATEGORIES | AGE 44 => AGE 41-55 | ALLOWS SOME STATISTICAL ANALYSIS WHILE OBSCURING SPECIFIC DATA. |

FIG. 1

SSN data type definition

Enter the name of the redaction method:

[ Aggregate ] — 204

202

What is the level that a value with this redaction method will be able to identify?
○ Identify someone uniquely
○ Identify someone uniquely in the application
● Identify a group uniquely
○ Identify a group uniquely in the application
○ Not needed for identification

⎫
⎬ 206
⎭

What is the trust level that is required from a third party to which the value with this redaction method is disclosed to be confident that no harm will come to the individual?
○ High
● Medium
○ Low

⎫
⎬ 208
⎭

[ Add a method ]  [ Finish ]

FIG. 2

| SSN | NOTHING | MASK | AGGREGATE | TOKEN |
|---|---|---|---|---|
| IDENTIFICATION SCOPE | UU | NI | GU | UA |
| TRUST REQUIREMENT | HIGH | LOW | MEDIUM | MEDIUM |

FIG. 3

| SSN | LOW | MEDIUM | HIGH |
|---|---|---|---|
| NI | MASK | MASK | MASK |
| GA | MASK | MASK | MASK |
| GU | MASK | AGGREGATE | AGGREGATE |
| UA | MASK | TOKEN | TOKEN |
| UU | MASK | TOKEN | NOTHING |

SSN use profile — 602

Do you need to know the content of SSN? — 604
- ○ No
- ○ No, but should know that it's there
- ● Yes, definitely
- ○ Would be nice What do you need SSN for? — 606
- ● Identify someone uniquely
- ○ Identify someone uniquely in the application
- ○ Identify a group uniquely
- ○ Identify a group uniquely in the application
- ○ Not needed for identification What is the nature of audience to which SSN is disclosed? — 608
- ○ Select few
- ○ Restricted to the application
- ● General public

POLICY AWARE CONFIGURABLE DATA REDACTION BASED ON SENSITIVITY AND USE FACTORS

FIELD OF THE INVENTION

This invention relates generally to document redaction.

SUMMARY

According to various embodiments, a computer-implemented method for redacting data is presented. The method includes obtaining from a user, using an electronic interface, for each of the plurality of redaction types, a corresponding identification scope and a corresponding disclosure impact, such that a plurality of triples are obtained, each triple comprising a redaction type, a corresponding identification scope, and a corresponding disclosure impact. The method also includes generating an initial redaction matrix from the plurality of triples, where the initial redaction matrix is incomplete. The method further includes obtaining from a user, using an electronic interface, a selection of a policy, where the policy specifies a technique for completing the initial redaction matrix, and applying the policy to the initial redaction matrix using an electronic processor, such that a completed redaction matrix is obtained. The method further includes obtaining, from a user, using an electronic interface, an indication of a need to know a content for each of a plurality of data types used in an application. The method further includes applying the completed redaction matrix to a corresponding data type used in the application, such that an application template is obtained, where the application template specifies a particular redaction type for each of the plurality of data types used in the application. The method further includes applying the application template to the application, such that data used by the application is redacted.

Various optional features of the above embodiments include the following. Each identification scope can be selected from the group consisting of: identify a person uniquely, identify a person uniquely in an application, identify a group uniquely, identify a group uniquely in an application, and not needed for identification. Each disclosure impact can include a level of trust required of a third party to which a value is disclosed. Each redaction type can be selected from the group consisting of: mask, tokenize, encrypt, categorize, randomize, and aggregate. The initial redaction matrix can include at least one blank entry for at least one trust requirement and disclosure impact pair. The policy can be defined to favor one of usefulness or protection. The completed redaction matrix can include at least one redaction type for each disclosure impact and identification scope pair. The obtaining an indication of a need to know a content for each of a plurality of data types used in an application can include obtaining a positive response for a specific data type, the method further including obtaining an indication of an identification scope and an indication of an intended audience for the specific data type. The method can further include notifying a user of a policy violation. The policy violation can be one of a usefulness violation and a protection violation.

According to various embodiments, a system for redacting data is presented. The system includes at least one processor configured to: obtain from a user, using an electronic interface, for each of the plurality of redaction types, a corresponding identification scope and a corresponding disclosure impact, such that a plurality of triples are obtained, each triple comprising a redaction type, a corresponding identification scope, and a corresponding disclosure impact. The processor(s) are further configured to generate an initial redaction matrix from the plurality of triples, where the initial redaction matrix is incomplete. The processor(s) are further configured to obtain from a user, using an electronic interface, a selection of a policy, where the policy specifies a technique for completing the initial redaction matrix, and apply the policy to the initial redaction matrix, such that a completed redaction matrix is obtained. The processor(s) are further configured to obtain, from a user, using an electronic interface, an indication of a need to know a content for each of a plurality of data types used in an application. The processor(s) are further configured to apply the completed redaction matrix to a corresponding data type used in the application, such that an application template is obtained, where the application template specifies a particular redaction type for each of the plurality of data types used in the application. The processor(s) are further configured to apply the application template to the application, such that data used by the application is redacted.

Various optional features of the above embodiments include the following. Each identification scope can be selected from the group consisting of: identify a person uniquely, identify a person uniquely in an application, identify a group uniquely, identify a group uniquely in an application, and not needed for identification. Each disclosure impact can include a level of trust required of a third party to which a value is disclosed. Each redaction type can be selected from the group consisting of: mask, tokenize, encrypt, categorize, randomize, and aggregate. The initial redaction matrix can include at least one blank entry for at least one trust requirement and disclosure impact pair. The policy can be defined to favor one of usefulness or protection. The completed redaction matrix can include at least one redaction type for each disclosure impact and identification scope pair. The at least one processor can be further configured to, upon obtaining a positive indication of a need to know for a specific data type, further obtain an indication of an identification scope and an indication of an intended audience for the specific data type. The at least one processor can be further configured to notify a user of a policy violation. The policy violation can be one of a usefulness violation and a protection violation.

According to various embodiments, non-transitory computer readable media is presented. The media include instructions which, when executed by at least one electronic processor, cause the at least one processor to: obtain from a user, using an electronic interface, for each of the plurality of redaction types, a corresponding identification scope and a corresponding disclosure impact, such that a plurality of triples are obtained, each triple comprising a redaction type, a corresponding identification scope, and a corresponding disclosure impact. The media further include instructions which, when executed by at least one electronic processor, cause the at least one processor to generate an initial redaction matrix from the plurality of triples, where the initial redaction matrix is incomplete, and to obtain from a user, using an electronic interface, a selection of a policy, where the policy specifies a technique for completing the initial redaction matrix. The media further include instructions which, when executed by at least one electronic processor, cause the at least one processor to apply the policy to the initial redaction matrix, such that a completed redaction matrix is obtained. The media further include instructions which, when executed by at least one electronic processor, cause the at least one processor to obtain, from a user, using an electronic interface, an indication of a need to know a content for each of a plurality of data types used in an application. The media include instructions which, when executed by at least one electronic processor, cause the at least one processor to apply the completed redaction matrix to a corresponding data type used in the application, such that an application template is obtained, where the application template specifies a particular redaction type for each of the plurality of data types used in the application. The media further include instructions which, when executed by at least one electronic processor, cause the at least one processor to apply the application template to the application, such that data used by the application is redacted.

BRIEF DESCRIPTION OF THE DRAWINGS

Various features of the embodiments can be more fully appreciated, as the embodiments become better understood with reference to the following detailed description, when considered in connection with the accompanying figures, in which.

DESCRIPTION OF EMBODIMENTS

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Law, regulation and public opinion require that many pieces of information be treated as more private than others. A person's name, once listed openly in any phone book, is now classified by the U.S. Department of Health and Human Services to be a personal identifier deserving of protection—concealment—along with items such as social security numbers, driver's license numbers, birth date, home address, current location, fingerprints, and many others. One consequence of this is that common places where such data may be used are now required by law and by custom to be protected from disclosure.

Prior art schemes for protecting data in materials such as documents and databases tend to take a binary approach: either remove the data, or do not. Known redaction methods for removing sensitive data include replacement with a category name, replacement with a string of Xs, encryption, and more.

Furthermore, in current practice, post-redaction uses are generally ignored, in part due to the difficulty of the great variability of what is possible and what is required for different types of private data.

Consequently, some embodiments protect private data and automatically compensate for differing use cases, while still providing guidance to maintain compliance with legal strictures if required or to otherwise navigate the usefulness/privacy tradeoff. More particularly, some embodiments generate a redacted document given a source of data with sensitive information and the post-redaction application for which the data is purposed. The post-redaction application can be represented by or associated with a reusable template that contains a specific level of protection (i.e., a redaction method) for the different data types that can be used as input. The result of applying the template to a source of data is a redacted document, where the redaction methods are appropriate for both the application's identification needs and target audience. Given a source of data, the application of different templates will result in documents with different redaction output. Likewise, a single template can be applied multiple times to different data sources in order to achieve a consistent redaction output from all of them.

In order to achieve this reusability and separation of concerns for redaction, embodiments can be configured or conceptualized as three frameworks, described as follows.

(1) A data type definition framework allows associating sensitivity factors with the different redaction methods of a data type to automatically produce a redaction matrix (or more than one, depending on one or more reference policies, based, for example, on HIPAA) for that data type. The redaction matrix gives the ability to select different redaction methods for different purposes while still complying with the policy. An example data definition framework is described below in reference to FIGS. 2-5. Redaction matrices may be defined once per data type/policy and reused for the general application and application reuse frameworks as explained below.

(2) A general application definition framework allows associating protection indicators with each data type of an application. The framework produces a template in which redaction methods are provided for each data type, together with policy exception warnings if the intended use of the data type does not comply with the reference policy (or, viewed another way, if enforcement of the reference policy will not allow for the intended use of the data type), e.g. if the application requires uniquely identifying an individual even though the data will be viewable by the general public. An example general application definition framework is described below in reference to FIGS. 6 and 7.

(3) An application reuse framework allows users with data to select an existing template based on their application needs. Ideally, once the template is chosen, there is no further action required to obtain data output with the appropriate protection level. An example application reuse framework is described below in reference to FIGS. 7 and 8.

Benefits of some embodiments include: a) they separate concerns in the process of redaction for privacy protection, i.e., separate users can work with data types, application templates, and input data, b) they allow reusability of protection settings for applications, c) they allow the automatic application of different redaction methods to the same data depending on the use, the general policy, and the target audience. An overview of an embodiment is described below in reference to FIG. 9.

Figure 1:
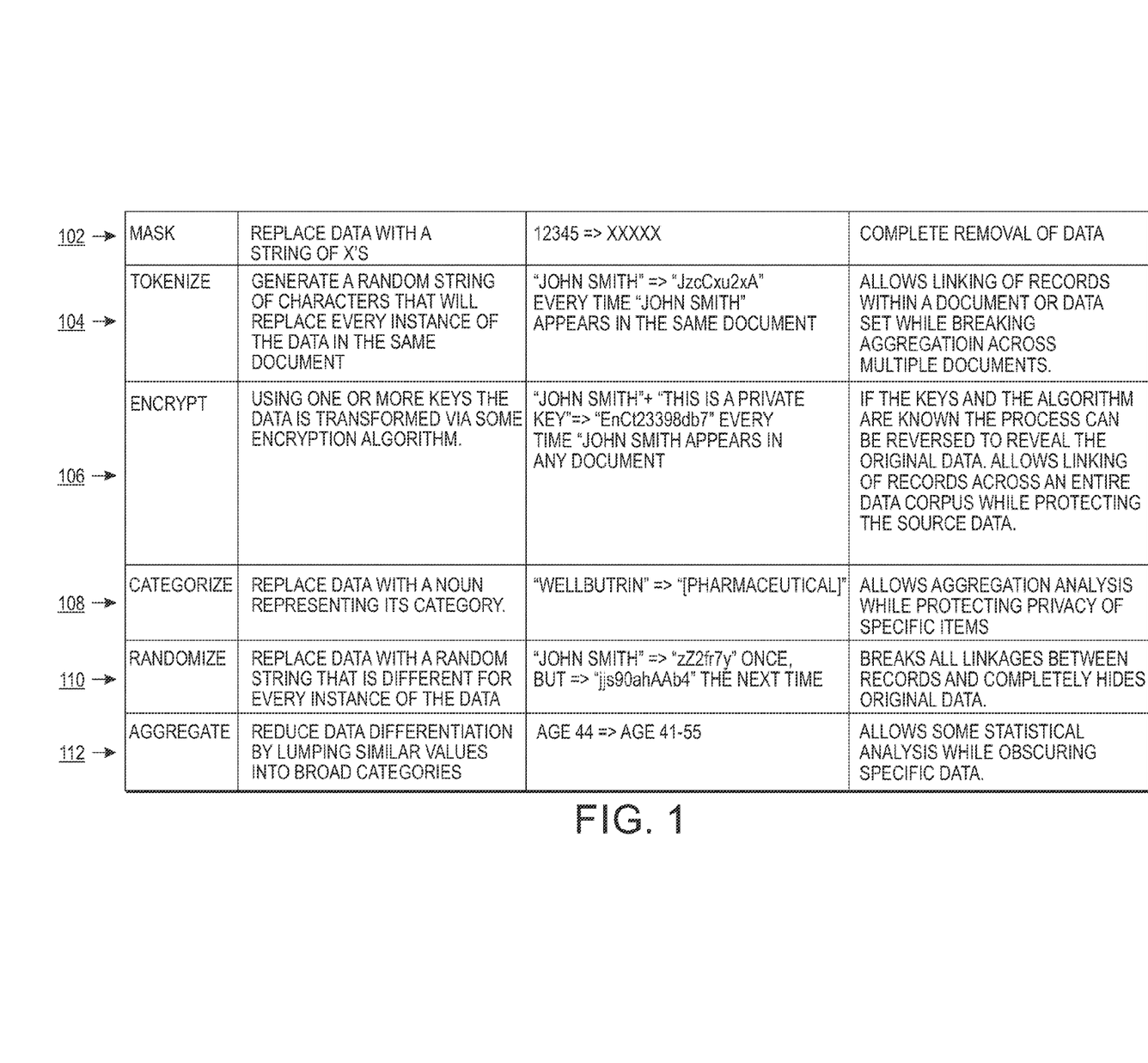
FIG. 1 is a chart illustrating various redaction methods according to some embodiments.

FIG. 1 is a chart illustrating various redaction methods according to some embodiments. In general, different types of data require different types of redaction to make them safe, often amounting to complete removal. A number of different methods exist to reduce the amount of information contained in a particular piece of data, thereby protecting the privacy of real people. Thus, FIG. 1 includes a table illustrating different types of redaction 102-112, along with their strengths and weaknesses. The table discusses types of processing that can be performed on data after redaction. This comes into play in data processing scenarios in which the documents in question may be spreadsheet data or some other format conducive to data mining.

In particular, FIG. 1 depicts mask redaction 102, in which data is replaced with a string of characters, e.g., X's. As a result, the contents of data subject to mask redaction are completely unavailable. Tokenize redaction 104 replaces every instance of a string with the same arbitrary characters. For example, if the name "Jonathan" is subject to tokenize redaction 104, then wherever the string "Jonathan" appears, it will be replaced by the same string, e.g., "Djh4jdSOh". Tokenize redaction allows for linking records within a document. Encrypt redaction 106 uses one or more encryption keys to encrypt data. Encrypt redaction 106 also allows for linking records while protecting source data. Categorize redaction 108 replaces terms with a representative category. Thus, for example, applying categorize redaction 108 to the string "Jonathan" might replace it with the string "Male". Randomize redaction 110 replaces every instance of a string with random data. Thus, applying randomize redaction 110 to the term "Jonathan" might result in replacement by the random string "EnCt1334U" in one instance and the string "jJ95Tuv8" in another instance. Aggregate redaction 112 replaces strings with ranges. Thus, aggregate redaction 112 is particularly suited to numbers. For example, applying aggregate redaction 112 to an age of 44 might result in replacement by the range 40-45.

Some embodiments assist in the choice of one of the different possible redaction methods like those depicted in FIG. 1. Each redaction method transforms the relative sensitivity of a value of that type, e.g., the sensitivity of a credit card number is high without any redaction, but low after masking is applied to it. Privacy concerns, which vary by data type, and post-redaction use, are both factors that affect the sensitivity of a data type within an application, and thus can be taken into account in selecting a redaction method. The following formalizes the notion of sensitivity based on these factors and suggests a method for their input by different user roles, based on which an embodiment can accomplish the goal. In particular, because sensitivity can be interpreted in different ways, this disclosure breaks down the concept of into two simpler factors, referred to herein as "identification scope" and "disclosure impact", or collectively as "sensitivity factors".

Figure 2:
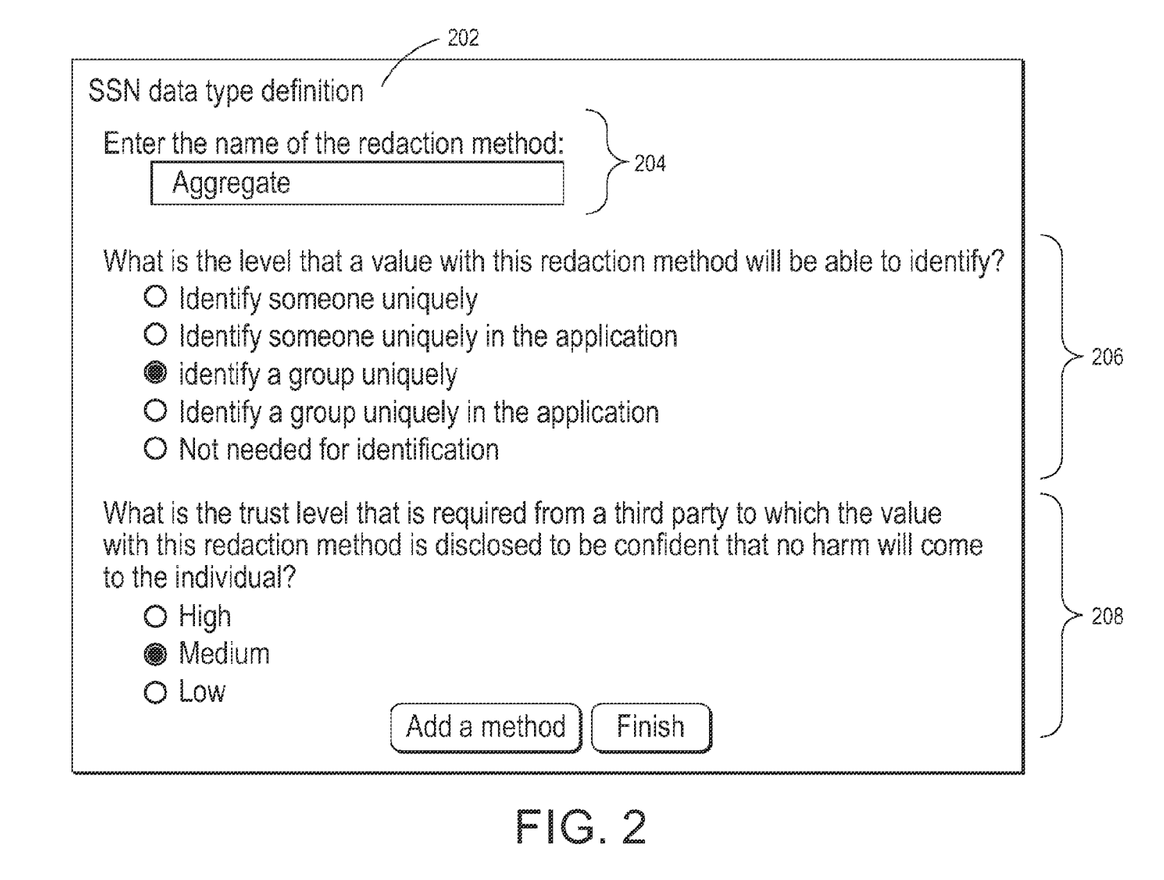
FIG. 2 is a partial screenshot illustrating a user interface for specifying identification scope and a disclosure impact for a particular data type and redaction method according to some embodiments.

FIG. 2 is a partial screenshot illustrating a user interface for specifying identification scope and a disclosure impact for a particular redaction method according to some embodiments. Note that every data type also can have a base sensitivity (sensitivity factor values) because, e.g., a social security number, being a unique identifier, reveals more information about an individual than does a zip code. Because "nothing" (showing a data type value with no redaction) can be a default redaction method, the specification of base sensitivity factors for a data type may, for illustrative purposes, be accomplished via the "nothing" method. Particular embodiments can differ in how this specification takes place. Some embodiments distinguish between a group comprising of any individual (i.e., the universe) and what is referred to as "application context", which is only the group of individuals that data in an application can reference. For example, the customers in a health insurance company's database provide an application context, because people that are not contained in this database cannot be referenced by the system.

"Identification scope" is related to the size of the group of individuals that a given value will be able to single out from within a larger and otherwise anonymous group. For example, a social security number ("SSN") is a unique identifier for one person in a group of all legally employed individuals in the US. Identification scope can be quantized into typical scopes that sensitive data can provide in general as follows. "Unique identification in the universe" ("UU") means, given a value, one individual can be singled out among the union of all individuals within and outside the application context. "Unique identification in the application context" ("UA") means, given a value, one individual can be singled out only among individuals within the application context, but still be indistinguishable from any other outside of this application context. "Group identification in the universe" ("GU") means, given a value, a group (of strictly more than one individual) can be singled out among the union of all groups within and outside the application context, where the individuals within the group are indistinguishable from each other. "Group identification in the application context" ("GA") means, given a value, a group (of strictly more than one individual) can be singled out only among groups within the application context, where the individuals within the group are indistinguishable from each other and the group is indistinguishable from all groups outside the application context. "No identification" ("NI") means, given a value, no individual is distinguishable from any other.

"Impact of disclosure" is related to the potential harm that can be brought to bear on an individual if a particular value is directly linked to him or her. In other words, given that the individual has been identified and the post-redaction value has been linked to them, this factor pertains to the extent of the adverse impact that is possible. Another way to view this factor is the trust that is required of a third party to which the redacted value is disclosed to be confident that no harm will come to the individual. Thus, the term "impact of disclosure" is synonymous with "trust requirement", i.e., the trust that is required of a third party to which the redacted value is disclosed to be confident that no harm will come to the individual. In general, impact of disclosure can be quantized as a progression of levels, e.g., low, medium, high.

Depending on the point of view (role) of the different users of disclosed embodiments, the sensitivity factors can be expressed in different ways. Embodiments provide different inputs that allow each user to specify these factors for different concerns in a way that directly pertains to their role or knowledge.

With the concepts of "identification scope" and "disclosure impact" understood, embodiments can be further characterized as follows. Embodiments can generate a redacted document, given a source of data with sensitive information and the post-redaction application for which the data is purposed. In general, embodiments can automatically link the sensitivity of data types and the sensitivity in the use of the data, as specified by different user roles, and use this combined information to determine the protection level that this use requires. This allows for the independent specification of data types and application use cases.

Thus, FIG. 2 depicts a user interface that can be considered part of the data type definition framework. As noted above, the data type definition framework allows for defining data types and their possible redaction methods, and links the redaction methods to sensitivity. A user can define a package (e.g., code or library) for each data type, to allow recognizing the data type within a data source and transforming values conforming to that data type by applying one or more redaction methods. (Data type recognition itself can be performed using known techniques, e.g., manual labeling.) This may be done once and used in a variety of applications via the general application and application reuse frameworks.

The user interface of FIG. 2 thus assists a user in defining the cases for data type redaction for the particular data type SSN 202 (embodiments provide similar interfaces for other data types). The user interface includes redaction method name field 204, into which a user can enter a name of a redaction method, e.g., "aggregate". The interface also includes identification scope query section 206, which permits a user to specify the particular identification scope for the specified data type. An example query can be, "what is the level that a value with this redaction method will be able to identify?" The interface also includes impact of disclosure section 208, which permits a user to specify the particular impact of disclosure for the specified data type. An example query can be, "what is the trust level that is required from a third party to which the value with this redaction method is disclosed to be confident that no harm will come to the individual?"

Figure 3:
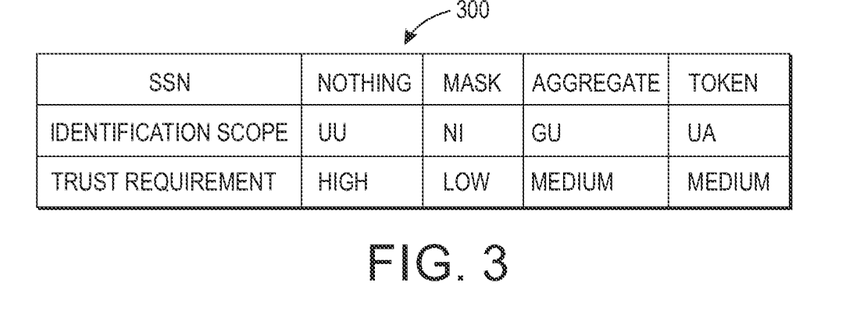
FIG. 3 is a chart illustrating acquired user redaction method characterizations according to some embodiments.

FIG. 3 is a chart illustrating acquired user redaction method characterizations according to some embodiments. Using the user inputs collected by, e.g., the user interface of FIG. 2 and similar ones for other data types, embodiments can construct correspondence table 300 that associates each given pair of values for <identification scope, impact of disclosure> to their corresponding redaction method. That is, FIG. 3 depicts a correspondence table for data type SSN built given the user inputs to the system's questions.

Figure 4:
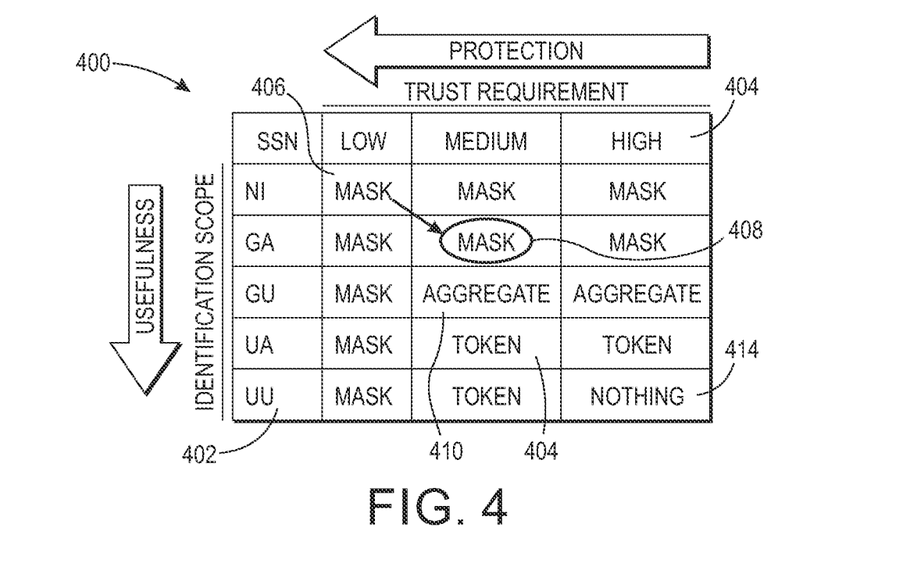
FIG. 4 is a schematic diagram of a completed redaction matrix according to some embodiments.

FIG. 4 is a schematic diagram of a completed redaction matrix according to some embodiments. In particular, FIG. 4 depicts redaction matrix 400 for data type SSN, where the headings 402, 404 are the levels of the sensitivity factors achievable after redaction. More particularly, columns in redaction matrix 400 represent trust requirements levels 404, and rows 401 represent identification scope.

Redaction matrix 400 is constructed by first filling in data acquired from a user via, e.g., the user interface of FIG. 2. (Correspondence table 300 of FIG. 3 can optionally be constructed as an intermediate step.) In particular, entries 406, 410, 412 and 414 are taken directly from the data entered at the user interface of FIG. 2 (or from correspondence table 300). Data from the user (or correspondence table 300) allows for obtaining a sparsely filled matrix, which is referred to herein as an "initial redaction matrix". Second, the initial redaction matrix is filled in with entries for all pairs of values of <identification scope, impact of disclosure>. Once filled in, the completed redaction matrix can serve as a lookup table that maps any given a pair of values for each of the sensitivity factors <identification scope, impact of disclosure> to an appropriate redaction method.

In order to automatically fill the rest of the entries, i.e., in order to complete an initial redaction matrix, embodiments utilize a formal privacy policy. A "privacy policy" as used herein is, in general, an algorithm used to fill in an initial redaction matrix. In practice, such an algorithm can be derived from any overarching regulatory instance, such as HIPAA; however, HIPAA itself is not considered a "privacy policy" for purposes of this disclosure.

Discussed presently are four specific, canonical privacy policies, which are defined to allow making the tradeoff between favoring usefulness (corresponding to the level of identification scope) or protection (corresponding to the level of trust requirement), and deciding whether to allow overkill in the disfavored factor. Favoring protection, for example, means that violations of usefulness are possible. A "violation" means using a level for the disfavored factor that does not offer the required usefulness/protection. Once a factor is favored, there is a choice of whether to allow overkill in the other factor. "Overkill" means using a level for the disfavored factor that offers more usefulness/protection than that required, e.g., overkill in usefulness could be allowed or not when protection is favored.

The four canonical privacy policies are discussed herein in reference to the following parameters. The term i represents the level of identification scope (IS). The term j represents the level of trust requirement (TR). The term cell[i,j] represents the value of the redaction method for levels i, j. The term UI[i,j] is a Boolean, referring to whether the cell[i,j] contains or not a user input (e.g., 406, 410, 412 and 414 of FIG. 4). The IS level i is ordered from the lowest to highest level of usefulness, i.e., if i∈[1,5], then i=1 corresponds to NI (no identification) and 1=5 corresponds to UU (unique identification in the universe) for the IS factor. The TR level j is ordered from the highest to lowest level of protection. (Recall that a high level of protection requires a low level of trust, i.e., if j∈[1,3], j=1 corresponds to low trust and j=3 to high trust.) The terms $IS_{max}$ and $TR_{max}$ refer to the highest levels of IS and TR respectively. With these terms understood, the canonical privacy policies can be defined as follows.

Policy 1: favoring protection, not allowing overkill in usefulness

For each cell[i,j], assign the nearest user input in the left upper quadrant of the redaction matrix, i.e.:
  cell[i,j]=cell[i*,j*] such that:
  i* is the highest value from 1 to i where UI[i*,x] is true for some x∈[1,j]
  j* is the highest value from 1 to j where UI[i*,j*] is true
  Starting with data acquired from a user, redaction matrix 400 is completed according to Policy 1. For example, cell[2,2] (408) is defined to be cell[i*,j*], where the above two bulleted conditions are met, i.e., i=j=1. Accordingly, cell[2,2]=cell[1,1] (406), which is equal to "mask".

Policy 2: favoring protection, allowing overkill in usefulness

For each cell[i,j], assign the nearest user input to the bottom left quadrant of the redaction matrix, else fill in as in Policy 1, i.e.:
  cell[i,j]=cell[i*,j*] such that:
  j* is the highest value from 1 to j where UI[x,j*] is true for some x∈[i, $IS_{max}$]; and
  i* is the lowest value from 1 to $IS_{max}$ where UI[i*,j*] is true.

Policy 3: favoring usefulness, not allowing overkill in protection

For each cell[i,j], assign the nearest user input in the right bottom quadrant of the redaction matrix, i.e.:
cell[i,j]=cell[i*,j*] such that:
j* is the lowest value from j to $TR_{max}$ where UI[x,j*] is true for some x∈[i, $IS_{max}$], and
i* is the lowest value from 1 to $IS_{max}$ where UI[i*,j*] is true.

Policy 4: favoring usefulness, allowing overkill in protection

For each cell[i,j], assign the nearest user input in the bottom left quadrant of the redaction matrix, else fill in as in Policy 3, i.e.:
cell[i,j]=cell[i*,j*] such that:
i* is the lowest value from i to $IS_{max}$ where UI[i*,x] is true for some x∈[1,j], and
j* is the highest value from 1 to j where UI[i*j*] is true.

Figure 5:
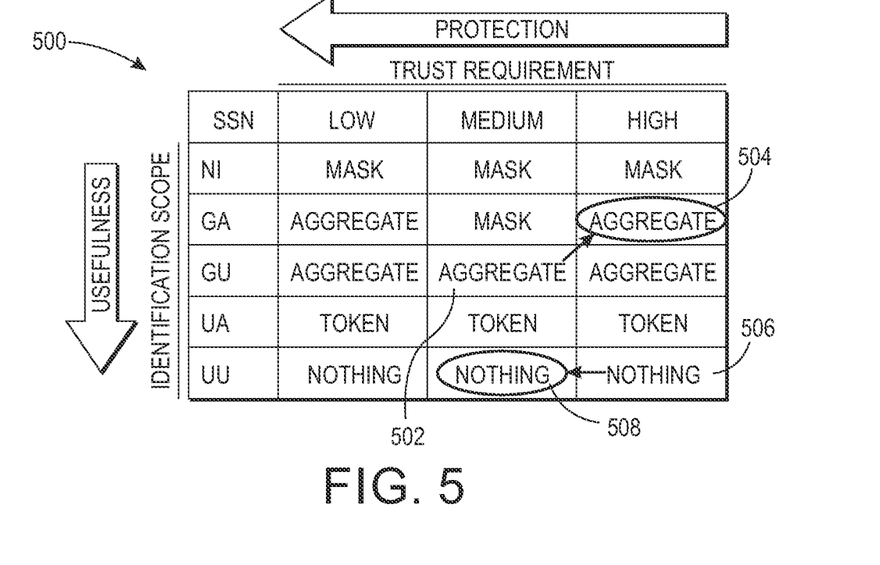
FIG. 5 is a schematic diagram of a completed redaction matrix according to some embodiments.

FIG. 5 is a schematic diagram of a completed redaction matrix according to some embodiments. Redaction matrix 500 starts out with the same user-supplied data as in redaction matrix 400 of FIG. 4 (taken from correspondence table 300). Redaction matrix 500, however, is completed according to Policy 4. For example, cell[2,3] (504) is defined to be the nearest user input in the bottom left quadrant of the redaction matrix, i.e., cell[3,2] (504), which equals "aggregate". Cell[5,2] (508) does not have a nearest user input in the bottom left quadrant of the redaction matrix, so it is defined according to Policy 3, i.e., the nearest user input in the right bottom quadrant of the redaction matrix, namely, cell[5,3], which is "nothing" (506).

In the canonical privacy policy definitions above, two redaction methods are available for any data type: "mask" and "nothing". These are therefore base cases that Policy 1 and Policy 3 rely on.

Although the above four canonical privacy policies have been identified, they do not constitute an exhaustive list. The data type framework allows for any algorithm to be used, as long as it is applied consistently to all data type definitions and is agnostic of the actual redaction methods used. For example, filling all missing entries with a single default user input is another valid policy within the framework.

Figure 6:
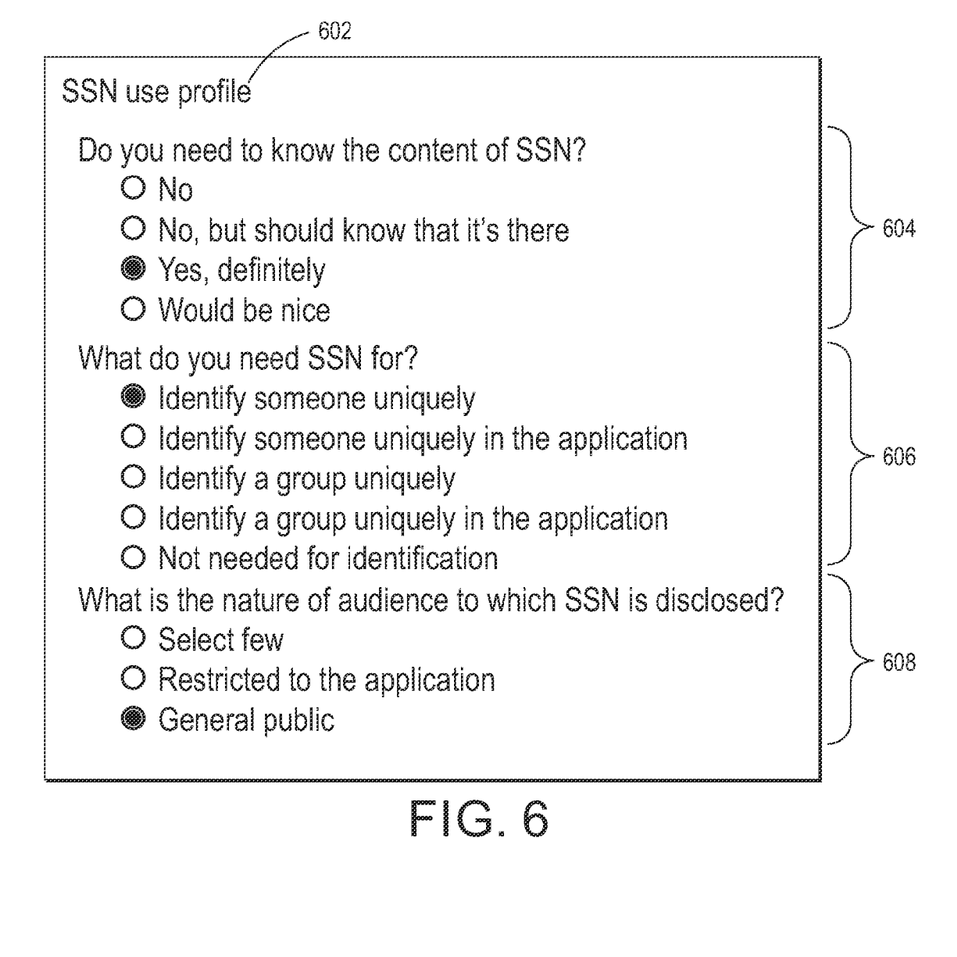
FIG. 6 is a partial screenshot illustrating a user interface for characterizing a particular data type used by an application according to some embodiments.

FIG. 6 is a partial screenshot illustrating a user interface for characterizing a particular data type used by an application according to some embodiments. In particular, the user interface of FIG. 6 is part of the general application definition framework as discussed above. In the general application definition framework, a user can create a template corresponding to knowledge of an application that will process multiple data sources. A template provides a collection of protection methods that are chosen for each data type that may appear in the input data. In order to produce such a template, the system relies on a given data type definition framework and input from a user of "protection indicators" for each data type.

"Protection indicators" can be defined as a mapping of the sensitivity factors according to the needs and characteristics of a particular application. The indicators can be expressed in terms of the knowledge of the user about the amount of information required in the application and the target audience of the redacted data to be used by the application.

For instance, if an application needs a data type to provide enough information to uniquely identify an individual, then this will directly map to the identification scope of each redaction method for the data type. Additionally, if the user knows that the redacted data will be disclosed to the general public, then this will mean that the redacted data must require a low level of trust. This again maps back to the trust requirement of each redaction method of the data type.

Embodiments can therefore proceed by querying a user as depicted in FIG. 6 for each data type. (FIG. 6 is, by way of non-limiting example, directed to the SSN data type 602.) More generally, the queries include (1) need to know for the data type, (2) identification purpose of the data type, and (3) target audience. These are described in detail presently.

Need to know for the data type (604) is used as follows. Different applications may require values for different data types. Any particular data type may thus not be needed in an application. If this is the case, that entire content can be dropped from the redacted output. Sometimes, even if specific values are not needed, an application may still need to be aware that the data type is present in the input data, e.g., if an employer needs to verify that an employee does or does not have an SSN. In that case, masking can be chosen automatically as the redaction method, as it will always be available for any type. Finally, the need of an application may or may not be strict (with answers of "Yes, definitely" and "Would be nice", respectively). This can affect the way that policy exceptions are handled as described below. The last two cases, in which there is some need to know the data, lead to answering the two questions below. That is, if the answer to the first question 604 is "no" or "no, but should know that it's there", then fields 606, 608 can be greyed out, for example.

Identification purpose of the data type (606) corresponds directly to the different identification scope levels described above. Note that the labels for each scope may mean different things depending on the nature of the data type. Appropriate labels for each scope can be chosen within the data type framework, when the data type is defined, and can be used as the options for the identification purpose in the template definition.

Target audience (608) is used as a link to the trust requirement defined in the data type framework. The correspondence used is that for a smaller audience, the trust requirement is less than for a larger audience, i.e., "select few" tolerates a redaction method that requires high trust, "restricted to the application" tolerates medium trust, and "general public" only tolerates low trust.

Once the user has answered all the questions for the different data types used by the application under consideration, (given options "yes, definitely" and "would be nice" in FIG. 6) the corresponding redaction method for each type that is needed are looked up in the redaction matrix for that type. The indices for the lookup correspond to the identification purpose and target audience selected.

Note that the questions are posed so that a user with knowledge of the application can answer without further consideration. Especially, questions about trust or impact, instead of target audience, would require further knowledge/judgment that the user with this role may not be equipped for.

Figure 7:
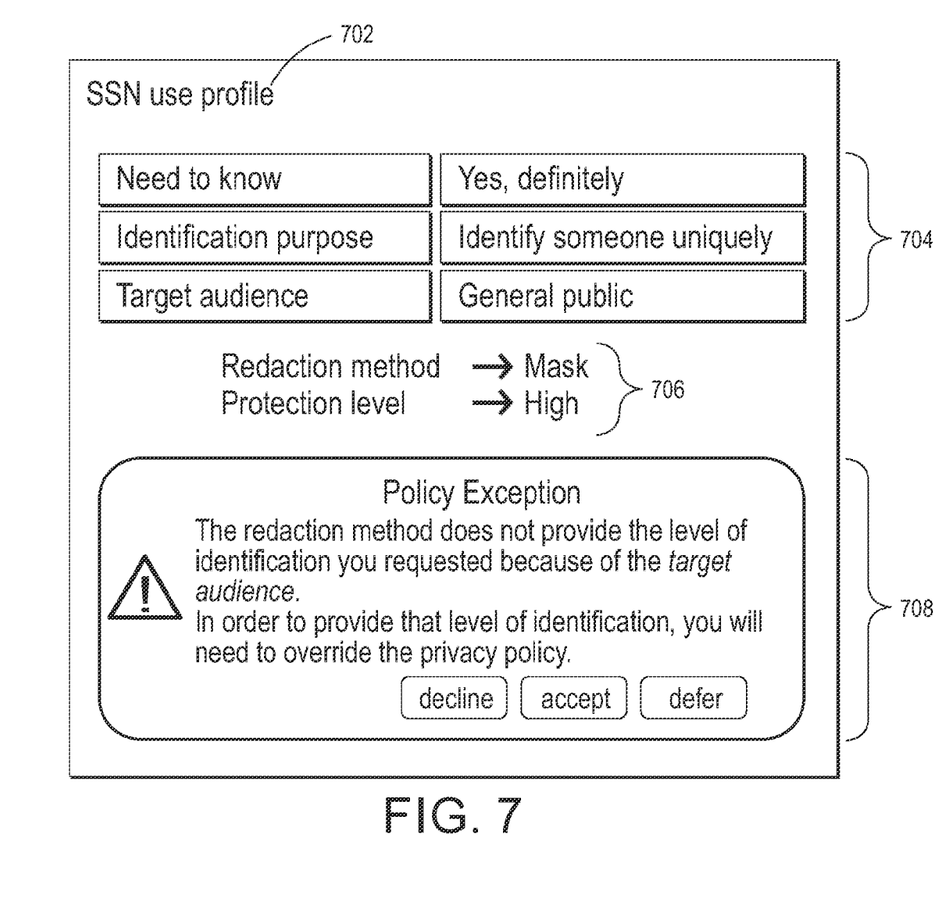
FIG. 7 is a partial screenshot of a user interface depicting a policy violation alert according to some embodiments.

FIG. 7 is a partial screenshot of a user interface depicting a policy violation alert according to some embodiments.

Depending on the policy used to fill the redaction matrix, the chosen redaction method may result in a violation of either usefulness or protection. In the example of FIG. 6, for Policy 1, the selections lead to a redaction method of "mask", which is a violation of usefulness (i.e., it does not meet the identification purpose of the data type requested by the user). In some embodiments, the canonical policies can be used to handle these violations in two ways. Note that for a policy favoring a given factor, there will only be possible violations of the disfavored factor.

A first way of handling violations is to ignore them (i.e., by directly applying the redaction method from the redaction matrix). This can be done for violations of usefulness when the data is "nice to know" and violations of protection when the data is "need to know". Note that in both cases the violation is not only consistent with the policy, but is also not considered critical to the user's needs and can thus be safely ignored.

A second way to handle is to request a policy exception for violations of usefulness when the data is "need to know" and violations of protection when the data is "nice to know". In these cases, because the violation is considered critical to the user, they can choose to allow a policy exception that removes the violation by choosing another redaction method to meet their needs. This choice may be assisted by the system using a new data type definition for an alternate policy or manually by the user given all choices. The user may even choose to defer the resolution of the exception violation to the data owner who will use the template as described below in reference to FIG. 8.

Figure 8:
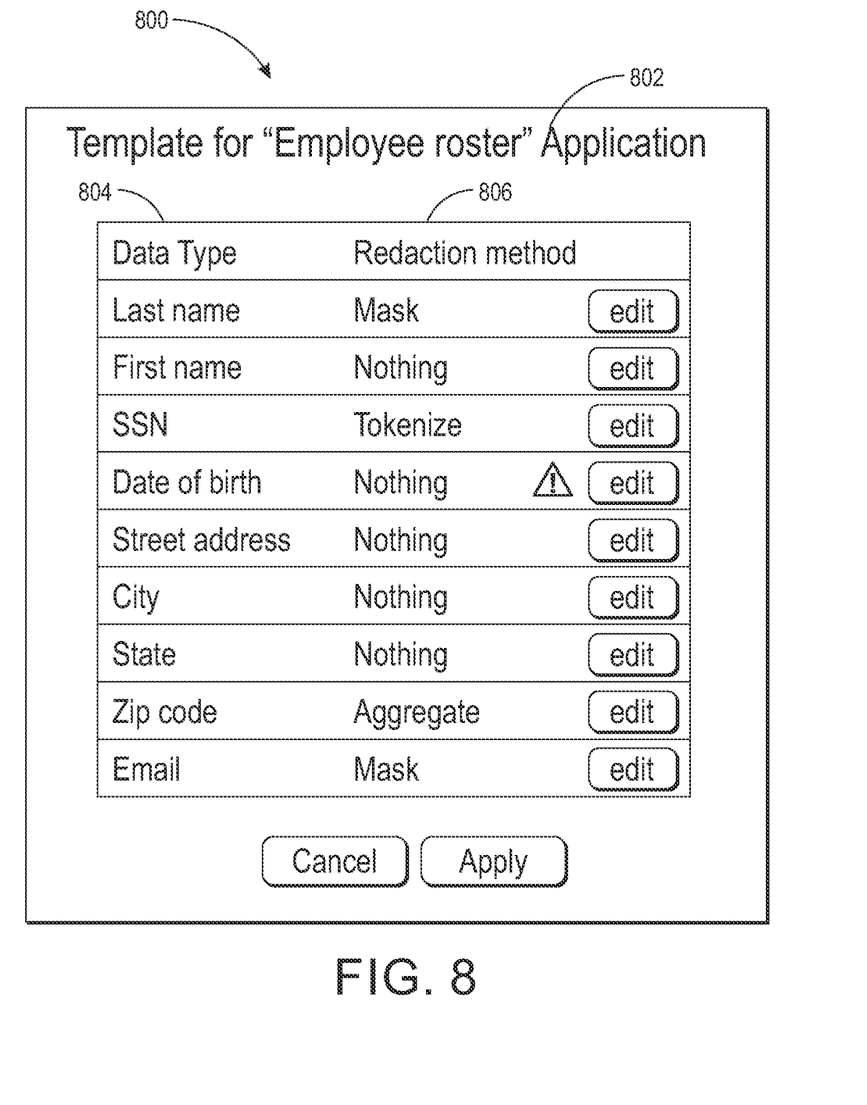
FIG. 8 is a partial screenshot of an application template according to some embodiments.

FIG. 8 is a partial screenshot of an application template according to some embodiments. In the application reuse framework, a user owning a data source in need of some particular processing (e.g., an employee roster application) only has to choose a pre-existing application template (e.g., template 800 for the employee roster application 802) corresponding to that processing need. The collection of redaction methods 806 from the template will then be applied to the content of all of the corresponding defined data types 804 that are present in the data. Note that a particular data set may contain only a subset of all of the data types defined in the template.

Unless the user chooses to override the redaction method for some data type given in the template, no further action is required to obtain a redacted document derived from the user's data source that is consistent with the application needs. However, to override the method for any data type and further tailor the redaction with specific knowledge of the application and the data, the user can simply go through the same prompt for the data type as described above in reference to FIGS. 6 and 7. In a particular embodiment, this may also be the case if the application framework includes an option to defer the input of the protection indicators to the data owner.

The reuse provided by this framework is given in the sense that multiple users with different data sources can use the same application template to obtain consistent redaction results for their data. The same is also true in the case of a single data owner with a stream of data sources that need to have the same protection applied each time a new one is processed.

Note that pre-defined redaction methods can be changed by the data owner, and any existing policy exceptions can also be shown.

Figure 9:
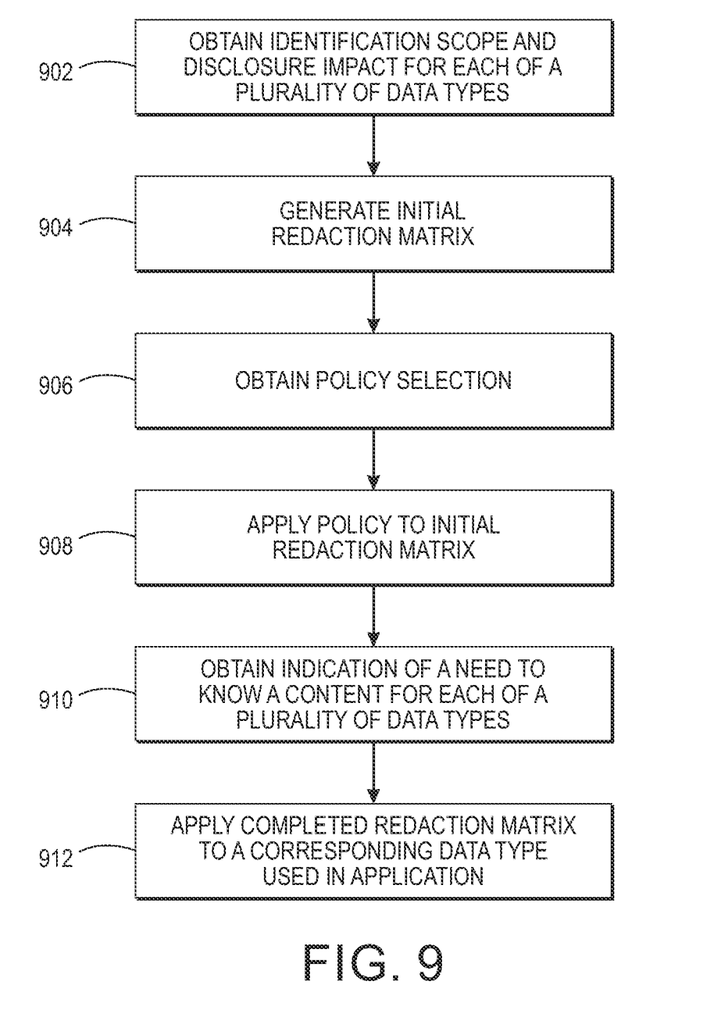
FIG. 9 is a flowchart illustrating a method according to some embodiments.

FIG. 9 is a flowchart illustrating a method according to some embodiments. The method depicted in reference to FIG. 9 can be implemented using a programmed computer system, for example.

At block 902, the method obtains identification scope and disclosure impact data for each of a plurality of data types. The action of this block can be accomplished as described above in reference to FIG. 2.

At block 904, the method generates an initial redaction matrix for each of a plurality of data types. The action of this block can be accomplished as described above in reference to FIG. 3, and, to some extent, FIGS. 4 and 5.

At block 906, the method obtains a policy selection. The action of this block can be accomplished by, e.g., a user selecting one of the four canonical privacy policies described herein. The user can perform such a selection by interacting with a graphical user interface, for example. Alternately, or in addition, the user can perform such a selection by providing code, e.g., in a scripting language such as PERL, input by way of a graphical user interface for example.

At block 908, the method applies the selected policy to an initial redaction matrix for each of a plurality of data types. The action of this block can be accomplished as described above in reference to FIGS. 4 and 5.

At block 910, the method obtains an indication of a need-to-know a content for each of a plurality of data types. The action of this block can be performed as described above in reference to FIG. 6.

At block 912, the method applies one of the completed redaction matrices to a corresponding data type used in an application. The action of this block can be performed as described above in reference to FIG. 8.

Certain embodiments described above can be performed in part using a computer application or program. The computer program can exist in a variety of forms, both active and inactive. For example, the computer program can exist as one or more software programs, software modules, or both, that can be comprised of program instructions in source code, object code, executable code or other formats, firmware program(s), or hardware description language (HDL) files. Any of the above can be embodied on a computer readable medium, which can include computer readable storage devices and media in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A computer-implemented method for redacting data, the method comprising:
obtaining from a user, using an electronic interface, for each of a plurality of redaction types, a corresponding identification scope conferred by a respective redaction type and a corresponding disclosure impact indicating an amount of harm, whereby a plurality of triples are obtained, each triple comprising a redaction type, a corresponding identification scope, and a corresponding disclosure impact, wherein each identification scope is selected from the group consisting of: identify a person uniquely, identify a person uniquely in an application, identify a group uniquely, identify a group uniquely in an application, and not needed for identification, and wherein each disclosure impact comprises a level of trust required of a third party to which a value is disclosed;

generating an initial redaction matrix comprising the plurality of triples wherein the initial redaction matrix is incomplete, and wherein the initial redaction matrix comprises at least one blank entry for at least one trust requirement and disclosure impact pair;

obtaining from a user, using an electronic interface, a selection of a policy, wherein the policy specifies a technique for completing the initial redaction matrix;

applying the policy to the initial redaction matrix using an electronic processor, whereby a completed redaction matrix is obtained, the completed redaction matrix associating a redaction type to each of a plurality of pairs of identification scope and disclosure impact;

obtaining, from a user, using an electronic interface, an indication of a need to know a content for each of a plurality of data types used in an application; and applying the completed redaction matrix to a corresponding data type used in the application, whereby an application template is obtained, wherein the application template specifies a particular redaction type for each of the plurality of data types used in the application; and applying the application template to the application, whereby data used by the application is redacted.

2. The method of claim 1, wherein each redaction type is selected from the group consisting of: mask, tokenize, encrypt, categorize, randomize, and aggregate.

3. The method of claim 1, wherein the policy is defined to favor one of usefulness or protection.

4. The method of claim 1, wherein the obtaining an indication of a need to know a content for each of a plurality of data types used in an application comprises obtaining a positive response for a specific data type, the method further comprising obtaining an indication of an identification scope and an indication of an intended audience for the specific data type.

5. The method of claim 1, further comprising notifying a user of a policy violation.

6. The method of claim 5, wherein the policy violation is one of a usefulness violation and a protection violation.

7. A system for redacting data, the system comprising at least one processor configured to:

obtain from a user, using an electronic interface, for each of a plurality of redaction types, a corresponding identification scope conferred by a respective redaction type and a corresponding disclosure impact indicating an amount of harm, whereby a plurality of triples are obtained, each triple comprising a redaction type, a corresponding identification scope, and a corresponding disclosure impact, wherein each identification scope is selected from the group consisting of: identify a person uniquely, identify a person uniquely in an application, identify a group uniquely, identify a group uniquely in an application, and not needed for identification, and wherein each disclosure impact comprises a level of trust required of a third party to which a value is disclosed;

generate an initial redaction matrix comprising the plurality of triples, wherein the initial redaction matrix is incomplete, and wherein the initial redaction matrix comprises at least one blank entry for at least one trust requirement and disclosure impact pair;

obtain from a user, using an electronic interface, a selection of a policy, wherein the policy specifies a technique for completing the initial redaction matrix;

apply the policy to the initial redaction matrix, whereby a completed redaction matrix is obtained;

obtain, from a user, using an electronic interface, an indication of a need to know a content for each of a plurality of data types used in an application; and apply the completed redaction matrix to a corresponding data type used in the application, whereby an application template is obtained, wherein the application template specifies a particular redaction type for each of the plurality of data types used in the application; and apply the application template to the application, whereby data used by the application is redacted.

8. The system of claim 7, wherein each redaction type is selected from the group consisting of: mask, tokenize, encrypt, categorize, randomize, and aggregate.

9. The system of claim 7, wherein the policy is defined to favor one of usefulness or protection.

10. The system of claim 7, wherein the at least one processor is further configured to, upon obtaining a positive indication of a need to know for a specific data type, further obtain an indication of an identification scope and an indication of an intended audience for the specific data type.

11. The system of claim 7, further configured to notify a user of a policy violation.

12. The system of claim 11, wherein the policy violation is one of a usefulness violation and a protection violation.

13. Non-transitory computer readable media including instructions which, when executed by at least one electronic processor, cause the at least one processor to:

obtain from a user, using an electronic interface, for each of a plurality of redaction types, a corresponding identification scope conferred by a respective redaction type and a corresponding disclosure impact indicating an amount of harm, whereby a plurality of triples are obtained, each triple comprising a redaction type, a corresponding identification scope, and a corresponding disclosure impact, wherein each identification scope is selected from the group consisting of: identify a person uniquely, identify a person uniquely in an application, identify a group uniquely, identify a group uniquely in an application, and not needed for identification, and wherein each disclosure impact comprises a level of trust required of a third party to which a value is disclosed;

generate an initial redaction matrix comprising the plurality of triples, wherein the initial redaction matrix is incomplete, wherein the initial redaction matrix comprises at least one blank entry for at least one trust requirement and disclosure impact pair;

obtain from a user, using an electronic interface, a selection of a policy, wherein the policy specifies a technique for completing the initial redaction matrix;

apply the policy to the initial redaction matrix, whereby a completed redaction matrix is obtained;

obtain, from a user, using an electronic interface, an indication of a need to know a content for each of a plurality of data types used in an application; and apply the completed redaction matrix to a corresponding data type used in the application, whereby an application template is obtained, wherein the application template specifies a particular redaction type for each of the plurality of data types used in the application; and apply the application template to the application, whereby data used by the application is redacted.

* * * * *